United States Patent [19]
Gans et al.

[11] Patent Number: 5,460,401
[45] Date of Patent: Oct. 24, 1995

[54] AIRBAG SYSTEM WITH TETHERED COVER

[75] Inventors: Russell S. Gans, Westland; Jeffery L. Scharret, Rochester Hills, both of Mich.; Donald R. Lauritzen, Hyrum, Utah; W. Gary Wirt, Clinton Township, Mich.

[73] Assignee: Morton International, Inc., Chicago, Ill.

[21] Appl. No.: 286,279

[22] Filed: Aug. 5, 1994

[51] Int. Cl.⁶ .................................................. B60R 21/16
[52] U.S. Cl. ................................... 280/728.3; 280/732
[58] Field of Search ........................... 280/728.3, 728.2, 280/732

[56] References Cited

U.S. PATENT DOCUMENTS

| | | | |
|---|---|---|---|
| 3,822,894 | 7/1974 | Muller et al. | 280/731 |
| 3,944,250 | 3/1976 | Wulf et al. | 280/732 |
| 4,893,833 | 1/1990 | DiSalvo et al. | 280/732 |
| 4,911,471 | 3/1990 | Hirabayashi | 280/732 |
| 4,964,653 | 10/1990 | Parker | 280/732 |
| 5,031,930 | 7/1991 | Sato | 280/732 |
| 5,064,217 | 11/1991 | Shiraki | 280/728.3 |
| 5,072,967 | 12/1991 | Batchelder et al. | 280/732 |
| 5,082,310 | 1/1992 | Bauer | 280/732 |
| 5,096,221 | 3/1992 | Combs et al. | 280/732 |
| 5,150,919 | 9/1992 | Sakakida et al. | 280/732 |
| 5,195,776 | 3/1993 | Sakakida et al. | 280/732 |
| 5,199,739 | 4/1993 | Fujiwara et al. | 280/732 |
| 5,211,421 | 5/1993 | Catron et al. | 280/728.2 |
| 5,211,422 | 5/1993 | Frantz et al. | 280/740 |
| 5,219,177 | 6/1993 | Wang | 280/728.3 |
| 5,242,191 | 9/1993 | Faigle et al. | 280/728.1 |
| 5,332,257 | 7/1994 | Rogers et al. | 280/728.3 |
| 5,398,960 | 3/1995 | Ravenberg et al. | 280/728.3 |

FOREIGN PATENT DOCUMENTS

| | | |
|---|---|---|
| 415362A2 | 9/1990 | European Pat. Off. |
| 3843686A1 | 6/1990 | Germany . |
| 2218698 | 1/1989 | United Kingdom . |

*Primary Examiner*—Kenneth R. Rice
*Attorney, Agent, or Firm*—Philip C. Peterson; Gerald K. White

[57] ABSTRACT

A tethered cover airbag system is provided for motor vehicles and the like having a panel formed with an opening in the vicinity of an occupant's seat and including an inflatable airbag mounted in a housing or canister for containing the bag in a deflated condition. The housing has an open end aligned with a panel opening to permit the airbag to pass outwardly when deployed for cushioning support for an occupant in the adjacent seat. A cover is provided for normally closing the panel opening to protect the airbag and is bodily movable to uncover the opening during airbag deployment. A flexible tether is interconnected between the cover and the panel edge or the housing for limiting the movement of the cover away from the panel during deployment. A suitable attachment system is provided for spreading the load exerted by the tether over a large area of the cover for reducing stress exerted on the cover during airbag deployment. The tether thus restrains the cover from moving around the passenger compartment of the vehicle in an uncontrolled manner during an airbag deployment and by reducing the load or stress exerted on the cover by the tether, the chance of break-up or fracturing of the cover into pieces is minimized.

18 Claims, 7 Drawing Sheets

FIG. 1
FIG. 2
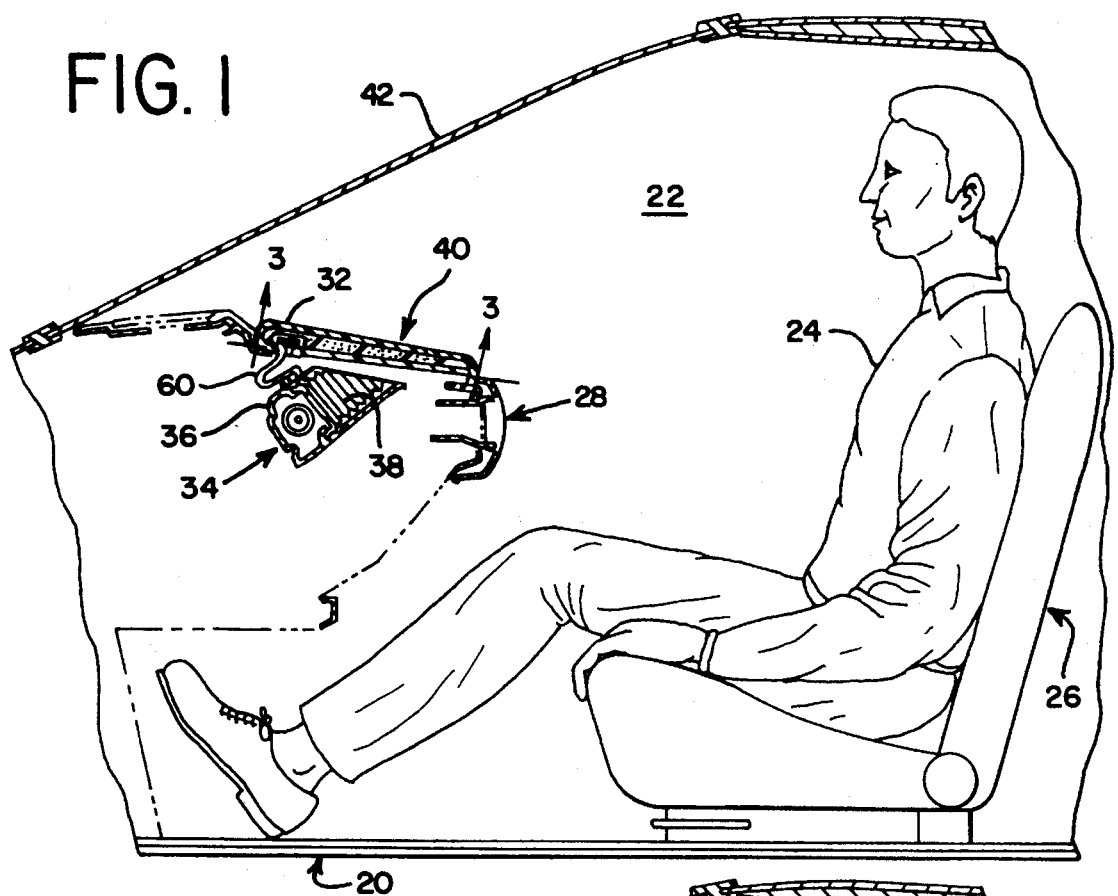
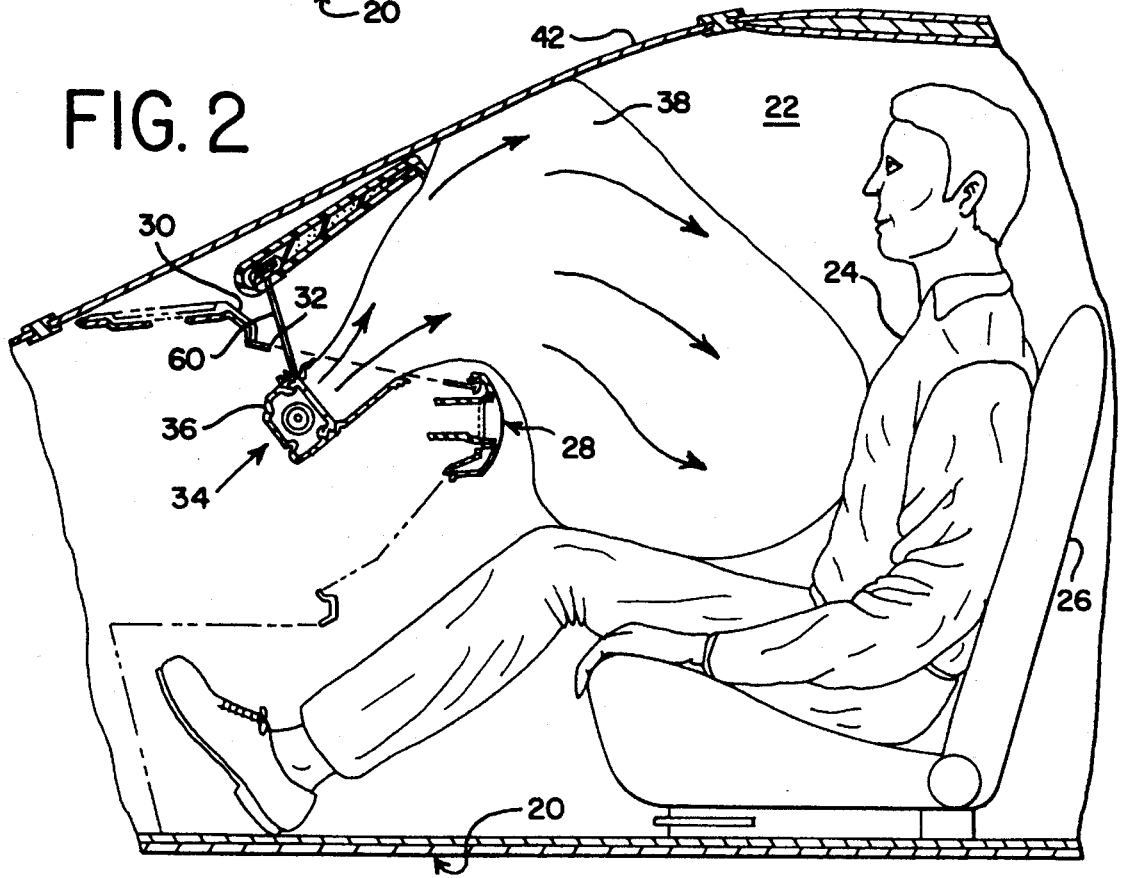

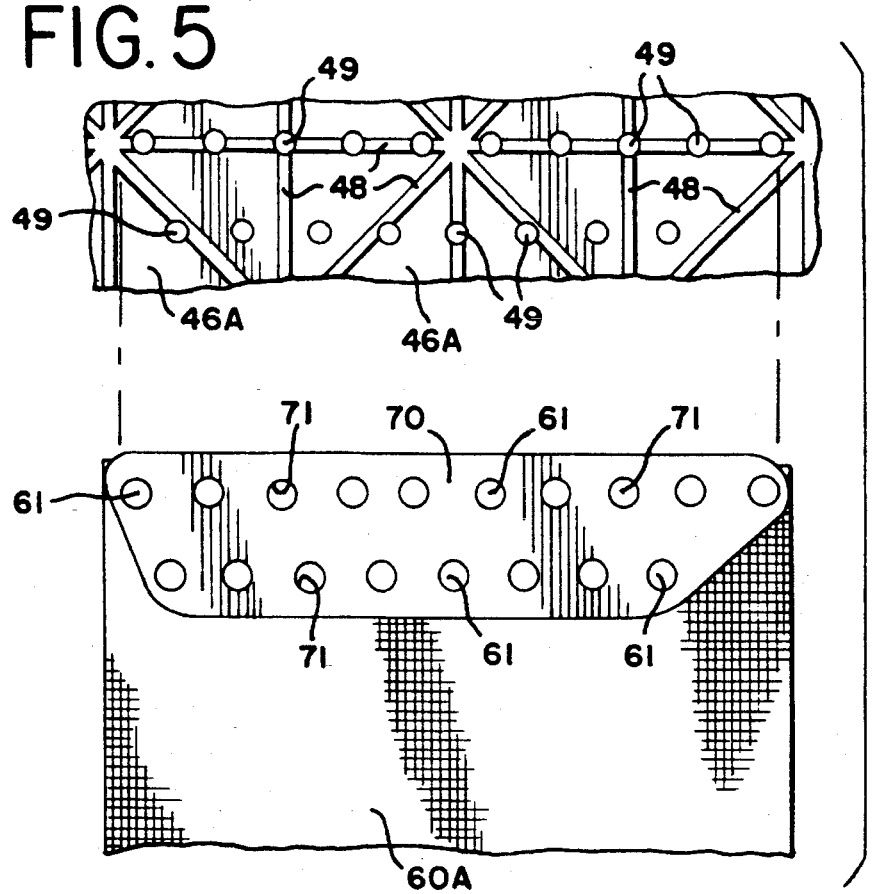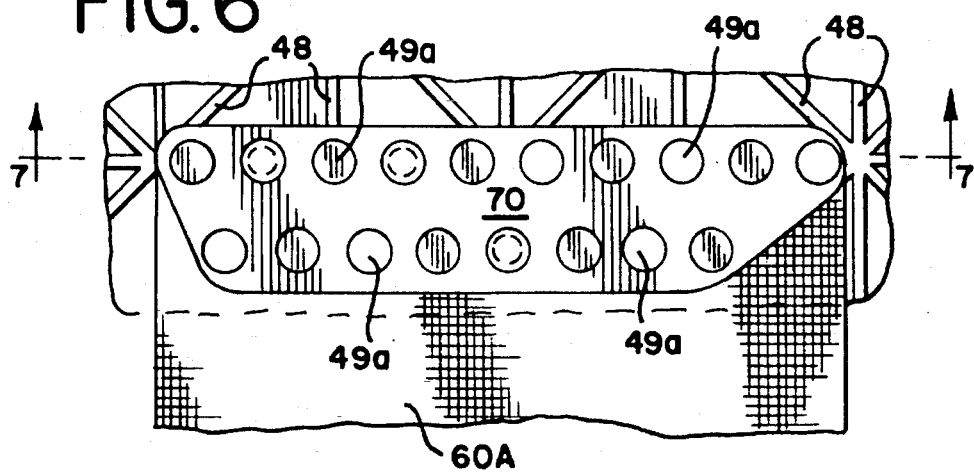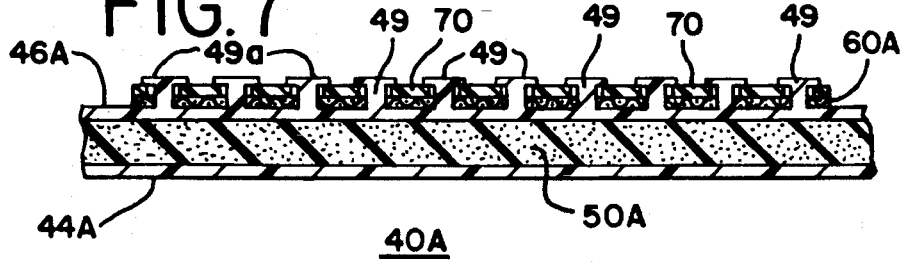

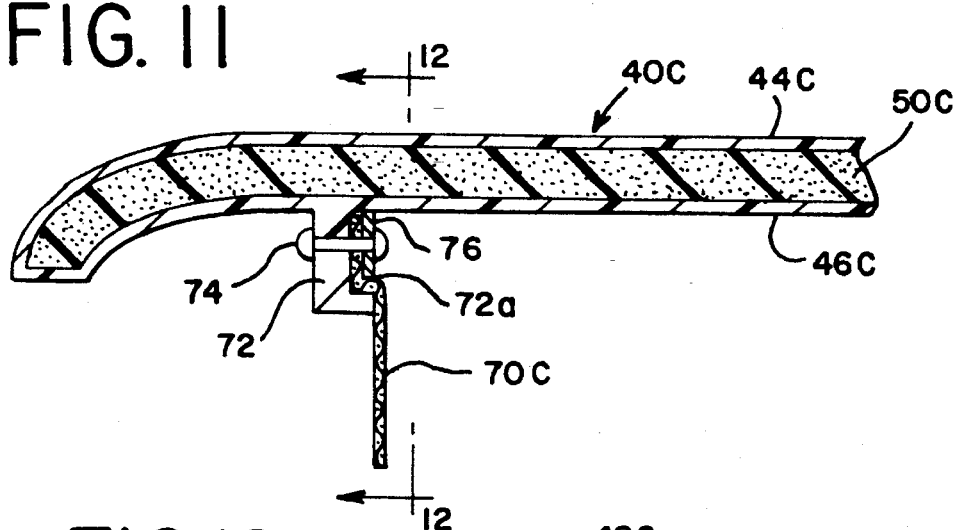
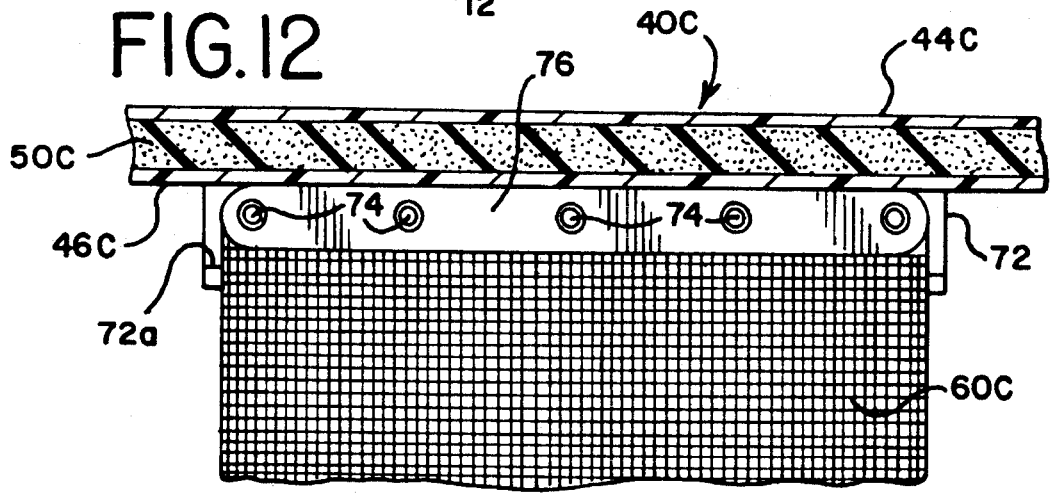
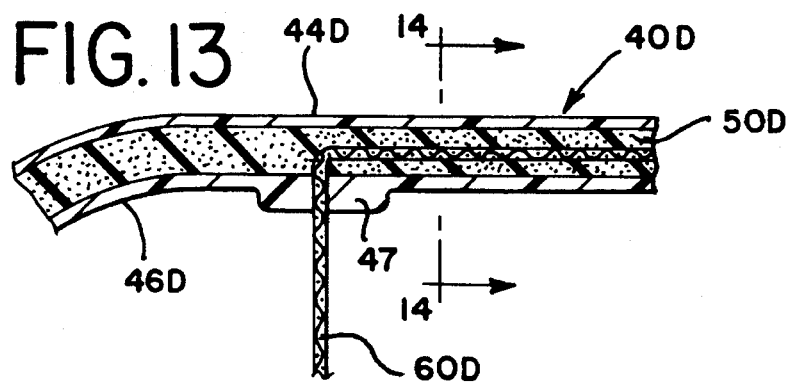
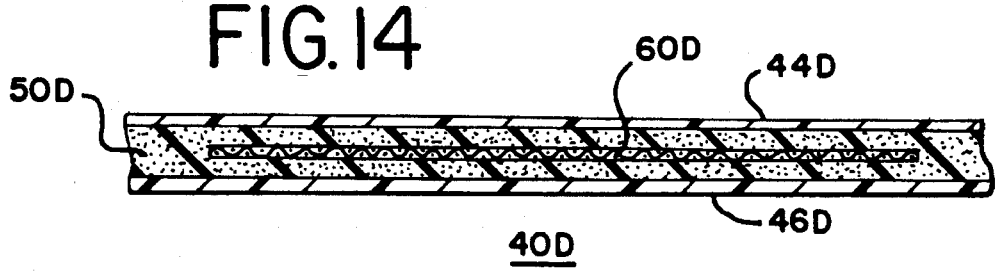

AIRBAG SYSTEM WITH TETHERED COVER

BACKGROUND OF THE INVENTION

1. Field of the Invention

The present invention relates to a tethered cover airbag system and more particularly to a motor vehicle airbag system employing a cover with a flexible tether interconnected to prevent the cover from damaging the occupants or surrounding environment during deployment of the bag. In airbag cushioning devices used in motor vehicles, it is desirable to restrain or limit the travel of a normally closed cover or door which is opened during airbag deployment. The cover or door normally closes an opening provided to accommodate passage of an inflating airbag as it is deployed. It is also desirable to prevent a cover or door from fracturing into pieces or fragments during airbag deployment.

2. Background of the Prior Art

U.S. Pat. No. 3,822,894 to Muller et al. discloses a steering wheel having a built-in air cushion employing a strong hinge between a cover and a dish containing the airbag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the airbag or gas cushion and which is retained by a flexible band so that the cover is restrained after opening.

The DiSalvo et al., U.S. Pat. No. 4,893,833, discloses a closure for an airbag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an airbag device in a motor vehicle wherein angular pivotal movement of a door over the airbag is restricted by a strap to limit the angular degree of opening when the airbag is inflated.

U.S. Pat. No. 4,964,653 to Parker discloses a self-skinned foam closure element for an inflatable restraint door assembly having a combination hinge and tether for restraining travel of the closure element during airbag deployment.

U.S. Pat. No. 5,064,217 to Shiracki discloses a cover for an airbag unit having "Nylon" yarn bands molded in place and wrapped around a retaining band of resin provided on the airbag enclosure or housing.

U.S. Pat. No. 5,150,919 to Sakakida et al. discloses an airbag system for a vehicle having a pair of doors or lids which pivotally open in opposite direction and which are restrained by belt members so that the lids pivot about transverse axes and open smoothly upon airbag deployment.

U.S. Pat. No. 5,195,776 to Sakakida et al. discloses an airbag installation having curved airbag cover lids which are reliably opened by rotation about a center point so as not to restrict the inflation of the airbag.

U.S. Pat. No. 5,072,967 to Batchelder et al. discloses an instrument panel having an invisible airbag deployment door with weakened sections formed therein but hidden from view for facilitating fracture of the door along predetermined lines for opening movement during airbag deployment.

The Combs et al., U.S. Pat. No. 5,096,221, discloses an airbag door having plural substrates on the inside which normally retain the door in a closed position and at least one of which is notched or provided with a hidden tear seam to facilitate fracture for opening of the door.

The Catron et al., U.S. Pat. No. 5,211,421, discloses an airbag cover door retainer having bifurcated engagement flanges on the door normally retaining the door in a closed position and releasable to permit door opening during airbag deployment.

The Fujiwara et al., U.S. Pat. No. 5,199,739, discloses an airbag cover opening mechanism for a motor vehicle including a sheer pin which is severed upon opening pressure exerted on the inside of the door by the deploying airbag.

The Wang, U.S. Pat. No. 5,219,177, discloses a releasable latch for an airbag deployment door which is activated by airbag deployment to permit the door to open.

U.S. Pat. No. 5,242,191 to Faigle et al., discloses a tethered airbag cover system wherein the cover is retained after opening attached to the airbag itself.

European Patent Application No. EPO 0415 362 A2 discloses an airbag supporting system having two fly-away covers restrained by loose flexible straps.

German Patent No. DE 38 43 686 A1 discloses an airbag cover for a car which is retained in one piece in relation to the dashboard of the automobile by a retaining hinge element.

OBJECTS OF THE INVENTION

Accordingly, it is an object of the present invention to provide a new and improved tethered cover airbag system for motor vehicles and the like and more particularly, to provide an airbag system having a cover for normally protecting the airbag but bodily movable to permit the bag to deploy outwardly when desired to protect an occupant of the vehicle.

It is another object of the present invention to provide an airbag system of the character described having a flexible tether connected between the cover and a panel of the vehicle or an airbag housing in the vehicle so that the amount of movement of the cover away from the closed position is limited or restrained.

Yet another object of the present invention is to provide a new and improved tethered cover for an airbag system wherein load spreading means is provided for attaching the tether to the cover so that the cover does not fracture or break apart during deployment of the airbag.

Another object of the present invention is to provide a new and improved airbag system having a tethered cover which normally limits the amount of travel of the cover away from the panel of the vehicle when the airbag is deployed.

BRIEF SUMMARY OF THE PRESENT INVENTION

The foregoing and other objects and advantages of the present invention are accomplished in a new and improved airbag system for motor vehicles and the like having a panel formed with an opening in the vicinity of an occupant's seat. An inflatable airbag is contained within a housing in a deflated condition and the housing is aligned with a panel opening to permit the airbag to pass outwardly when deployed to provide cushioning support for an occupant of the seat during an emergency. A cover is provided for normally closing the panel opening to protect the airbag assembly and is movable bodily away from the opening during airbag deployment. In order to prevent the cover or portions thereof from moving about the vehicle in an uncontrolled manner, a flexible tether is interconnected between the cover and the panel or the housing of the airbag assembly for positively limiting the distance of travel of the cover during airbag deployment. A load spreading attachment is provided between the cover and the tether so that stress exerted by the tether on the cover during opening deployment of the airbag is spread over a relatively large area on the cover, thus reducing the possibility that the cover will fracture or break up, yet still positively retaining the cover a limited distance away from the panel opening.

BRIEF DESCRIPTION OF THE DRAWINGS

For a better understanding of the present invention, reference should be had to the following detailed description taken in conjunction with the drawings, in which:

FIG. 1 is a longitudinal cross-sectional view of a motor vehicle illustrating a tethered cover airbag system in accordance with the present invention and shown with the cover in a closed position over a panel opening while the airbag is in deflated condition;

FIG. 2 is a similar longitudinal cross-sectional view illustrating graphically the deployment of the airbag and the cover in an open position but tethered a limited distance away from the panel opening;

FIG. 5 is an underside view of a portion of separated components of a modified cover and tether combination used for spreading the load exerted by the tether over a large area on the cover and illustrating the components before they are assembled together;

FIG. 6 is a view similar to FIG. 5 illustrating the cover and tether combination after the tethered cover has been secured together in a heat staking operation;

FIG. 7 is a cross-sectional view taken substantially along lines 7—7 of FIG. 6;

FIG. 11 is a fragmentary, transverse cross-sectional view of yet another tether and cover combination in accordance with the present invention for interconnecting a tether and cover in a manner whereby the stress or load exerted by the tether on the cover is spread out over a wide area of the cover;

FIG. 12 is a cross-sectional view taken substantially along lines 12—12 of FIG. 11;

FIG. 13 is a fragmentary, transverse cross-sectional view of yet another embodiment of a cover and tether combination and interconnection arrangement wherein the tether is connected by being molded in place in the structure of the cover;

FIG. 14 is a cross-sectional view taken substantially along lines 14—14 of FIG. 13;

DETAILED DESCRIPTION OF A PREFERRED EMBODIMENT OF THE INVENTION

Figure 3:
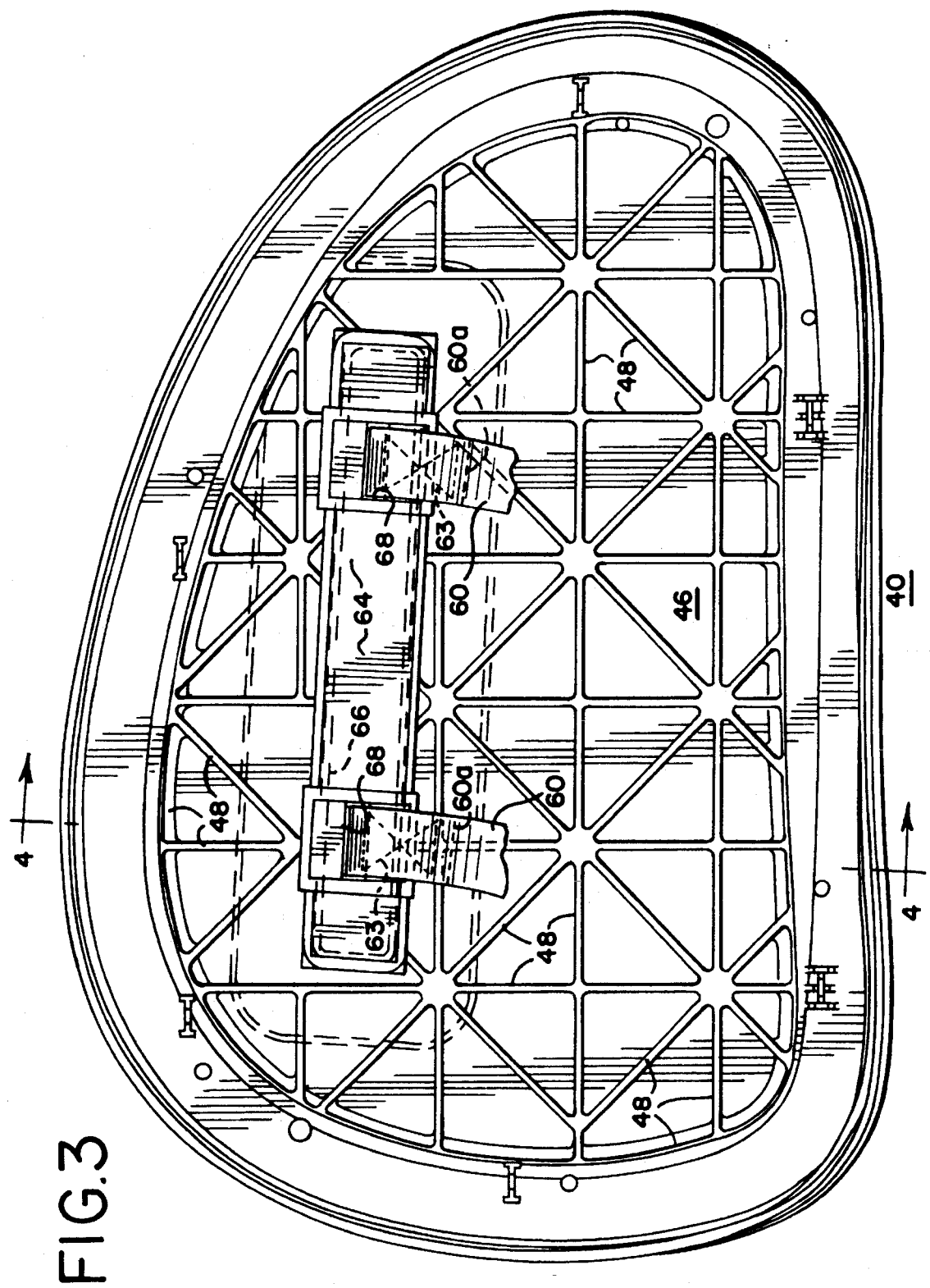
FIG. 3 is an underside view of a cover in accordance with the features of the present invention.

Referring now more particularly to the drawings, in FIGS. 1–4 is illustrated a motor vehicle 20 having a passenger compartment 22 for accommodating a person 24 in seated position on a vehicle seat 26. Forward of the occupant 24, the vehicle 20 includes a dashboard 28 and a panel 30 having an enlarged opening 32 spaced directly above an airbag and inflator assembly generally indicated by the reference numeral 34. The airbag and inflator assembly 34 includes a housing or canister 36 fixedly mounted in place beneath the panel 30 and the opening 32. An airbag 38 in deflated condition is stored and contained within the housing 36 until deployed as illustrated in FIG. 2 to protect the vehicle occupant 24 from injury in an accident.

Figure 4:
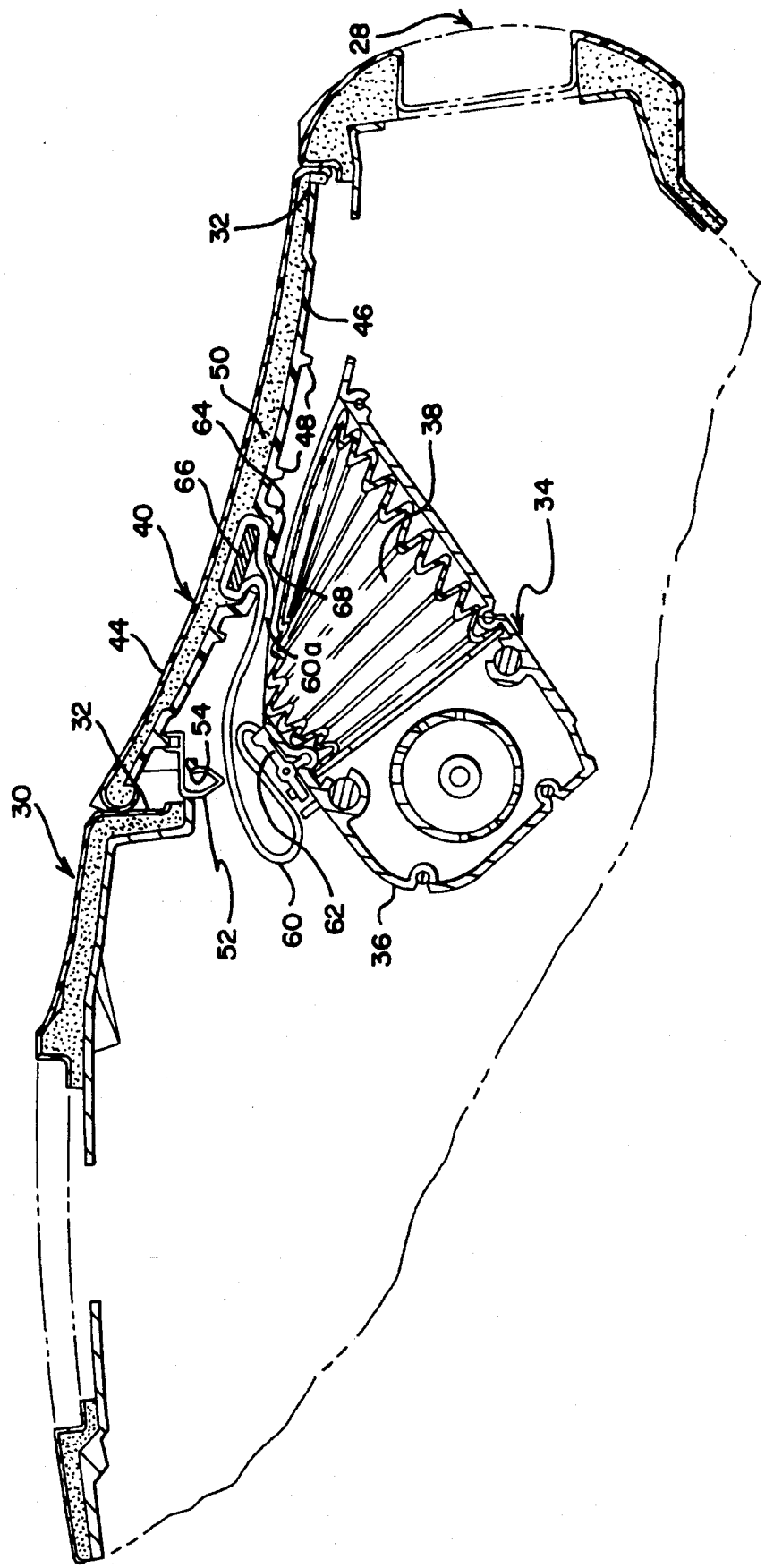
FIG. 4 is an enlarged cross-sectional view similar to that of FIG. 1 showing the cover in a closed position covering the panel opening with the airbag in a deflated, stored condition ready for deployment.

The panel opening 32 is normally closed by a movable cover 40, which as shown in FIGS. 1 and 4 forms part of the upper surface of the panel 30 above the opening 32. When the airbag 38 is inflated during a crash or emergency and expands outwardly, the cover 40 is rapidly moved away from the panel opening 32 permitting the expanding airbag to rapidly inflate as shown in FIG. 2. When this occurs, the cover 40 if otherwise untethered could bounce off a windshield 42 or other interior surface in passenger compartment 22.

The cover 40 includes an outer skin 44 formed of molded resinous plastic material and an inner skin 46 also formed of relatively thick resinous plastic material to provide strength and integrity for the cover 40 overall so that break up or fracture of the cover into pieces does not occur upon airbag deployment.

As can be seen from FIG. 3, a number of integral ribs 48 are molded into the inner skin 46 for stiffening purposes and a layer of foam 50 is bonded between the inner and outer skins 46 and 44, respectively, of the cover 40 to provide a strong and lightweight body. Normally the cover 40 is retained in a closed position (FIG. 1) directly above and over the opening 32 by a plurality of pins or spring latch elements 52 which are locked into openings 54 (FIG. 4) provided in a lower flange of the panel 30, around the edge of the opening 32. Until the airbag 38 is deployed, the cover 40 acts as an integrated part of the panel 30 and at the same time protects the airbag assembly 34 from damage and limits access thereto.

In accordance with the present invention, one or more tethers 60 of strong, flexible material such as "Nylon" webbing or the like is interconnected between the underside of the cover 40 and the housing or canister 36 of the airbag inflator assembly 34. Inner ends of the flexible tethers 60 are interconnected to the upper sidewall of the housing or canister 36 by means of metal or plastic clips 62 (FIG. 4).

Referring now specifically to FIGS. 3 and 4, the inner skin 46 of the cover 40 is formed with an elongated, generally rectangular compartment 64 therein in order to accommodate a stiffening bar 66 formed of metal or other suitable stiff and strong material such as resinous plastic. As best shown in FIG. 4, an outer end portion 60a of the tethers 60 are looped around the bar 66 and a free end or bitter end of each tether web is stitched as at 63 or otherwise fastened to the main body portion of the tether web. The formed housing 64 is provided with slots 68 in the wall at appropriate intervals along the length thereof so that when the airbag 38 is deployed and the cover 40 is ejected away from the opening 32 in the panel 30, the force exerted by the tether webs 60 in a taut condition (FIG. 2) is spread by the stiffening bar 66 over substantially all of the length of the cover 40. This attachment arrangement greatly reduces the stress exerted by the tether 60 on the cover 40 during deployment of the airbag 38 and normally prevents fracture of the cover 40 into pieces or fragments which could become projectiles causing damage or injury.

It should also be noted that the tethers 60 may be formed of a variety of webbing materials and materials such as common seat belt webbing may be utilized if desired. The number of tethers 60 may be increased if needed for an exceptionally long cover 40 so that three rather than two tethers may be provided. In any case, the end portions 60a of the tethers are stitched 63 and looped around the stiffening bar 66 which is contained between the inside wall 46 and the outside wall 44 of the foam filled 50 cover 40.

Referring now to FIGS. 5–7, therein is illustrated a modified form of cover 40A and a flexible tether 60A. The cover 40A includes a molded resinous plastic inner skin 46A having stiffening ribs 48A like the previous embodiment but also employing a plurality of cylindrically-shaped projections or stakes 49 in one or more rows along the length of the cover 40A in approximately the same location as the rectangular housing 64 is formed on the inner skin 46 of the cover 40. The tether 60A is formed of woven webbing in substantially greater width than the tether 60 and is in the form of a "Nylon" scrim material which is strong, light in weight, flexible and relatively low in cost. The webbing material of the tether 60A has an open mesh and is formed with a plurality of punched, circular holes 61 arranged in a pattern to match that of the stakes 49 on the inner skin 46A of the cover 40A. After the tether 60A is placed with the stakes 49 aligned to seat and extend through the holes 61, a fastening plate 70 of relatively stiff material such as strong ABS plastic or metal is positioned to overlie the tether 60A transversely across the width thereof. The plate 70 is formed with a plurality of openings 71 matching the pattern of the openings 61 in the webbing of the tether 60A and aligned with the respective stakes 49.

Outer ends of the stakes 49 are headed over by the application of heat and pressure in a heat staking operation to form enlarged button-like retaining heads 49a to clamp and hold the stiffening plate 70 tightly against the tether 60A which in turn is pressed against the body of the inside skin 46A of the panel 40A.

Figure 8:
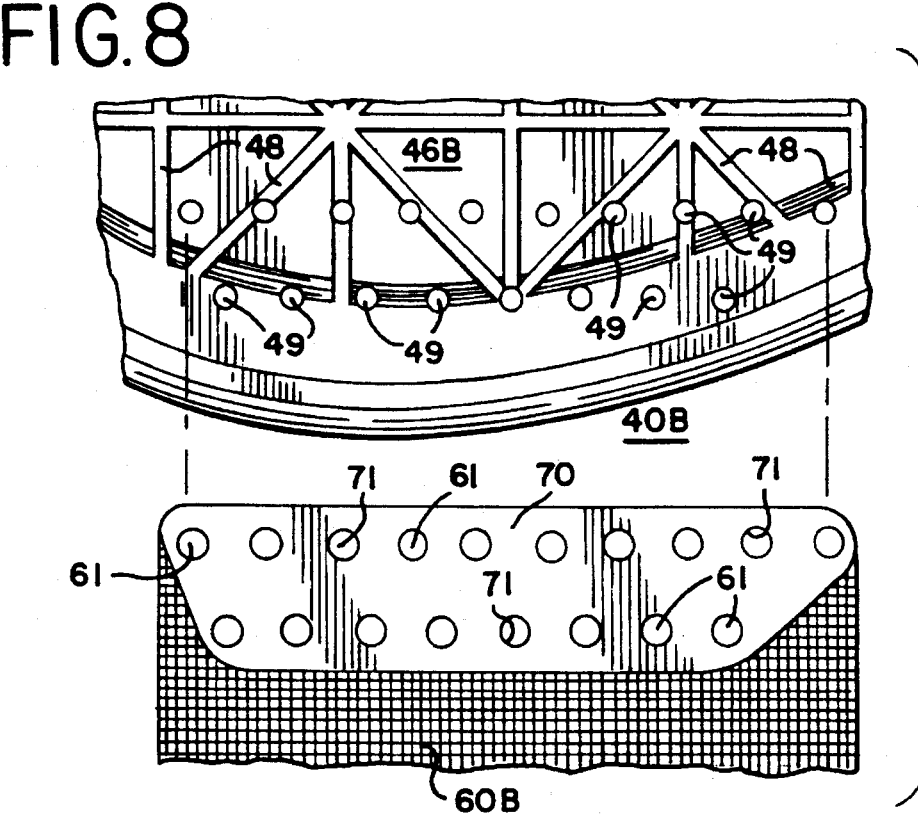
FIG. 8 is a view similar to FIG. 5, but illustrating yet another modified form of cover and tether combination shown with the components thereof spaced apart from one another prior to interconnection.
Figure 9:
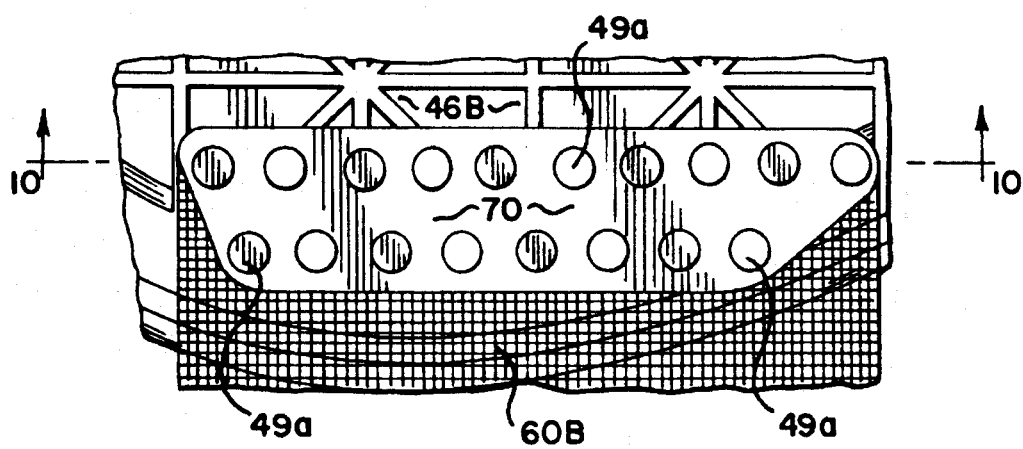
FIG. 9 is an underside view of the cover and tether combination of FIG. 8 after interconnection in a heat staking operation.
Figure 10:
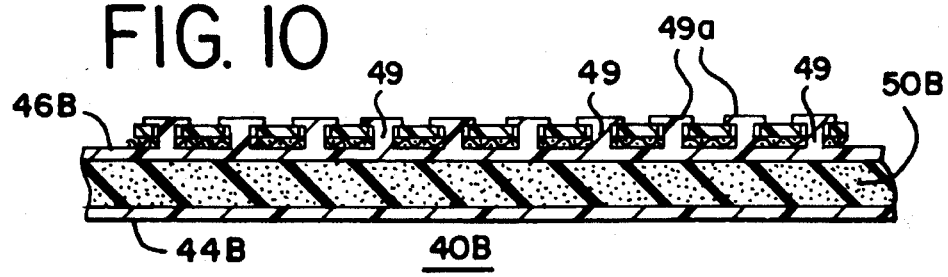
FIG. 10 is a cross-sectional view taken substantially along lines 10—10 of FIG. 9.

Referring now to FIGS. 8–10, therein is illustrated another embodiment of a cover and tether combination which is generally similar to the embodiment previously described and illustrated in FIGS. 5–7. In the embodiment of FIGS. 8–10, a cover 40B is illustrated having an outer skin 44B and an inner skin 46B provided with a plurality of integral ribs 48 and inwardly projecting cylindrical stakes 49 as in the prior embodiment. A tether 60B comprising a wide webbing of lightweight, more finely woven cloth of strong "Nylon" or other flexible fibrous strands is utilized instead of the open mesh type of scrim material of the tether 60A of the prior embodiment. The outer terminal end portion of the tether 60B is also formed with a plurality of openings 61 arranged in a pattern in rows to match the spacing and pattern of the heat stakes 49 of the cover 40B. A stiffening plate 70 similar to the plate of the previous embodiment is provided and includes a plurality of spaced openings 71 concentric with the opening 61 to match the pattern of the heat stakes 49. After the stiffening element 70 and end portion of the tether cloth 60B is in place on the stakes 49 as shown in FIG. 9, the stakes are heated and pushed over at the outer ends to form button-like retaining portions 49a in a heat staking operation as previously described herein.

The embodiment of FIGS. 5–7 on the one hand and the embodiment of FIGS. 8–10 on the other, have an essential difference in the type of tether material that is utilized but both tethers 60A and 60B are wide and extend for a substantial length across the width of the respective covers 40A and 40B. Moreover, the manner of attachment of the tether material is generally the same in both cases and because of the elongated pattern of the spaced apart heat stakes 49, the load or stress transmitted from the tethers 60A and 60B, respectively, to the respective covers 40A and 40B is spread over a relatively large area so that stress is reduced and fracture of the covers is not likely to occur upon deployment of the airbag 38.

Referring now to FIGS. 11 and 12, therein is illustrated another embodiment of the present invention wherein a cover 40C is provided having an outer skin 44C of resinous plastic material and an inner skin 46C of resinous plastic material separated by a foam layer 50C in between.

In accordance with the invention, the inner skin 46C of the cover 40C is provided with an elongated integrally formed rib 72 of substantial thickness and depth and the rib is formed with a shallow recess 72a along the length thereof on one face, in which recess is mounted an end portion of a flexible tether 70C having a substantial width and substantial strength similar to the material of tethers 60A and 60B as previously described. The outer end portion of the tether 70C is securely fastened to the rib 72 on the inside skin 46C by a plurality of rivet fasteners 74 provided at spaced intervals along the length of the rib. The flexible tether 70C is relatively wide and extends across a substantial portion of the respective cover 40C so as to spread the load over a relatively large area adjacent the elongated integral rib 72 on the inside skin 46. Thus, the cover 40C is unlikely to fragment or sever into portions or particles during deployment of the airbag 38 because the stress exerted by the tether 60C on the cover is relatively low and is spread over a wide area.

Referring now to FIGS. 13 and 14, therein is illustrated yet another embodiment of a tether and cover combination including a cover 40D having an outer skin 44D and a spaced apart inner skin 46D of resinous plastic material separated by a layer of foam 50D. A tether 60D formed of flexible open mesh "Nylon" scrim like the tether 60A is integrally molded in place within the foam 50D between the inner and outer skins 46D and 44D of the cover 40D. In this arrangement, the strands of the tether 60D act as reinforcing bars to further strengthen the cover 40D and provide an extremely strong bond between the cover and tether over a substantial area of the panel so that stress exerted from the tether on the panel during airbag deployment is reduced and spread widely over the cover.

As shown in FIG. 13, the flexible tether 60D passes out through the inner skin 46D of the panel 40D in a thickened segment 47 which provides better stress distribution to the panel.

Figure 15:
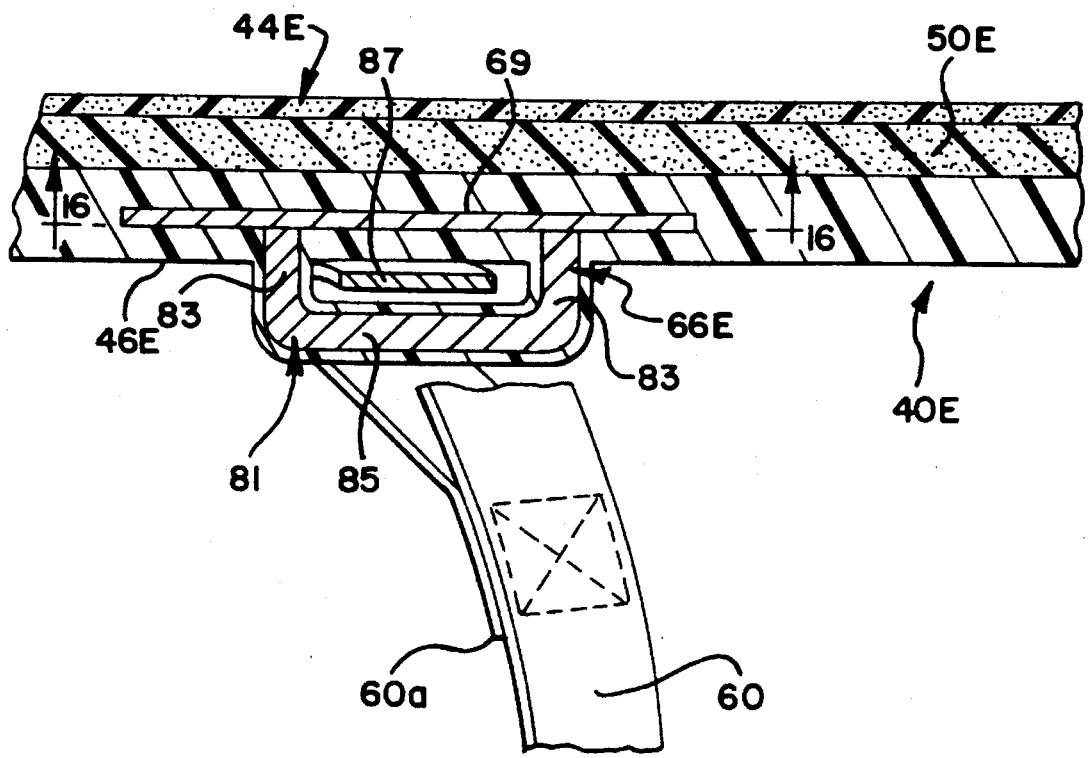
FIG. 15 is a fragmentary transverse cross-sectional view of still another embodiment of a cover and tether combination and interconnection structure wherein a metal stiffening element with an outwardly extended ring is molded into the cover and a tether is looped around the ring.
Figure 16:
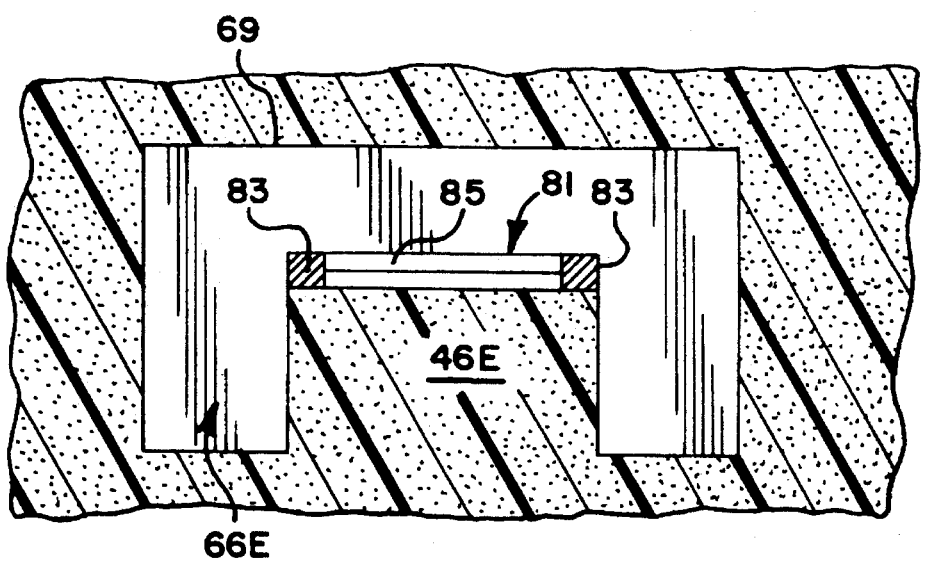
FIG. 16 is a cross-sectional view taken substantially along lines 16—16 of FIG. 15.

Referring now to FIGS. 15 and 16, therein is illustrated a still further embodiment of a cover and tether combination including a cover 40E having an outer skin 44E formed of molded resinous plastic material and having an inner skin 46E also formed of molded resinous plastic material and spaced apart from the outer skin by a layer of cellular foam material 50E.

A metal load spreader and tether anchor 66E having a relatively large, load spreading base plate 69 of generally rectangular shape is provided for securing a tether strap 60 of the web belt or "Nylon" strapping type to the cover 40E. The load spreading base plate 69 is integrally molded in place in the molded plastic inner skin 46E and is designed to spread any force exerted by the tether strap 60 on the cover 40E over a substantial area thereof. In accordance with the present invention, a rectangular metal ring 81 having a pair of legs 83 extending outwardly of the inner skin 46E is provided for attachment of the tether 60. The legs 81 are integral with or joined to the base plate 69 and are joined together at their outer ends by a bight 85 forming a rectangular open space 87 through which the tether strap 60 is passed. The bight 85 is generally parallel to the inner surface of the inner skin 46E and has a length that is long enough to accommodate the width of the tether strap 60 which is looped around the bight through the space 87.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag system for motor vehicles and the like, having a panel formed with an opening in the vicinity of an occupant's seat, and including an inflatable airbag and a housing for containing said airbag in a deflated condition, said housing having an open end aligned with said panel opening to permit said airbag to pass outwardly when deployed to provide cushioning support for an occupant of said seat, comprising:

cover means normally closing said panel opening for protecting said airbag and movable to uncover said opening during airbag deployment;

flexible tether means interconnected between said cover means and at least one of said panel and said housing for limiting the movement of said cover means away from said panel during airbag deployment;

attachment means for spreading a load exerted by said tether means over an area of said cover means for reducing stress thereon during deployment of said airbags said attachment means including a stiffener element in contact with a first end portion of said tether means looped around said stiffener element; and said cover means including inner and outer skins with said stiffener element and said first end portion of said tether means positioned between said skins.

2. An airbag system for motor vehicles and the like, having a panel formed with an opening in the vicinity of an occupant's seat, and including an inflatable airbag and a housing for containing said airbag in a deflated condition, said housing having an open end aligned with said panel opening to permit said airbag to pass outwardly when deployed to provide cushioning support for an occupant of said seat, comprising:

cover means normally closing said panel opening for protecting said airbag and movable to uncover said opening during airbag deployment;

flexible tether means interconnected between said cover means and at least one of said panel and said housing for limiting the movement of said cover means away from said panel during airbag deployment;

attachment means for spreading a load exerted by said tether means over an area of said cover means for reducing stress thereon during deployment of said airbag, said attachment means including a stiffener element in contact with a first end portion of said tether means; and said cover means including integral rib means for attachment to said first end portion of said tether means and said stiffener element.

3. The airbag system of claim 2, wherein:

said attachment means includes a plurality of fasteners spaced apart along said rib means for securing said first end portion of said tether means and said stiffener element thereto.

4. An airbag system for motor vehicles and the like, having a panel formed with an opening in the vicinity of an occupant's seat, and including an inflatable airbag and a housing for containing said airbag in a deflated condition, said housing having an open end aligned with said panel opening to permit said airbag to pass outwardly when deployed to provide cushioning support for an occupant of said seat, comprising:

cover means normally closing said panel opening for protecting said airbag and movable to uncover said opening during airbag deployment;

flexible tether means having a first end portion and interconnected between said cover means and at least one of said panel and said housing for limiting the movement of said cover means away from said panel during airbag deployment;

attachment means for spreading a load exerted by said tether means over an area of said cover means for reducing stress thereon during deployment of said airbag;

said cover means being formed of molded resinous plastic material having inner and outer skins spaced apart; and said first end portion of said tether means being integrally molded in place between said inner and outer skins.

5. The airbag system of claim 4, wherein:

said first end portion of said tether means is formed of woven mesh having openings receiving said resinous plastic material of said cover means.

6. A cover and tether combination for use with an airbag system and a panel opening, comprising:

cover means normally closing said panel opening and bodily movable away from said panel upon deployment of said airbag;

tether means of strong, flexible woven stranded material having an inner end secured to said panel or said airbag system and an outer end connected to said cover means for limiting the travel of said cover means away from said panel opening when said airbag is deployed;

attachment means for spreading a load exerted by said tether means on said cover means during airbag deployment over a substantial portion of said cover means;

said cover means including spaced apart inner and outer skins formed of resinous plastic material; and said attachment means including an elongated bar mounted in said cover means positioned between said skins.

7. The cover and tether combination of claim 6, wherein:

said tether means includes a plurality of spaced apart flexible webs having outer ends extended around said bar.

8. The cover and tether combination of claim 7, wherein:

said outer ends of said webs are looped around said elongated bar at spaced apart positions along the length of said bar.

9. The cover and tether combination of claim 6, wherein:

said inner skin is formed with a compartment for containing said elongated bar.

10. The cover and tether combination of claim 9, wherein:

said compartment includes a plurality of spaced apart slots along the length of said bar; and said flexible webs extend through said slots.

11. The cover and tether combination of claim 6, wherein:

said elongated bar is formed of metal and extends across a substantial portion of said cover means.

12. The cover and tether combination of claim 6, wherein:

said tether means comprises an open mesh type stranded material having an outer end extending across a substantial portion of said cover.

13. The cover and tether combination of claim 12, wherein:

said cover means includes a layer of foam material between said inner and outer skins; and said outer end of said tether means is molded in place within said layer of foam material.

14. The cover and tether combination of claim 13, wherein:

said tether means extends inwardly of said inner skin through a slot formed therein.

15. The cover and tether combination of claim 6, wherein:

said attachment means comprises a plate secured to said cover means having a ring projecting outwardly of an inner face of said cover means forming an opening for looping said tether means around said ring.

16. The cover and tether combination of claim 15, wherein:

said cover means is formed of molded resinous plastic material; and said plate and ring are formed of metal and said plate is integrally molded in place in said cover means.

17. The cover and tether combination of claim 15, wherein:

said ring includes a pair of legs extending outwardly of an inside surface of said cover means and a bight spaced parallel of said inside surface joined between outwardly extending ends of said legs.

18. The cover and tether combination of claim 17, wherein:

said bight has a length greater than a width of said tether means looped around said ring.

* * * * *